(12) United States Patent
Pan et al.

(10) Patent No.: US 7,803,883 B2
(45) Date of Patent: Sep. 28, 2010

(54) HYDROGENATION OF DIENE-BASED POLYMER LATEX

(75) Inventors: Qinmin Pan, Waterloo (CA); Garry Rempel, Waterloo (CA); Zhenli Wei, Qingdao (CN)

(73) Assignee: LANXESS Inc., Sarnia, Ontario (CA)

( * ) Notice: Subject to any disclaimer, the term of this patent is extended or adjusted under 35 U.S.C. 154(b) by 106 days.

(21) Appl. No.: 12/336,099

(22) Filed: Dec. 16, 2008

(65) Prior Publication Data

US 2009/0258996 A1  Oct. 15, 2009

(30) Foreign Application Priority Data

Dec. 17, 2007 (EP) ................................. 07123383

(51) Int. Cl.
*C08F 8/04* (2006.01)
(52) U.S. Cl. ................. 525/339; 525/331.9; 525/332.8; 525/332.9; 525/333.1; 525/333.2; 525/338
(58) Field of Classification Search .................. 525/338, 525/339
See application file for complete search history.

(56) References Cited

U.S. PATENT DOCUMENTS

| | | | |
|---|---|---|---|
| 3,454,644 A | 7/1969 | Dewhirst | 260/570.9 |
| 4,452,950 A | 6/1984 | Wideman | 525/339 |
| 4,517,390 A * | 5/1985 | Russell et al. | 568/881 |
| 5,021,649 A | 6/1991 | Nishimura et al. | 250/231.16 |
| 5,039,737 A | 8/1991 | Parker et al. | 524/804 |
| 5,057,581 A | 10/1991 | Rempel et al. | 525/338 |
| 5,087,676 A | 2/1992 | Heider et al. | 526/93 |
| 5,272,202 A | 12/1993 | Kubo et al. | 524/565 |
| 5,340,858 A | 8/1994 | Bauer et al. | 524/162 |
| 5,340,859 A | 8/1994 | Aydin et al. | 524/162 |
| 5,350,787 A | 9/1994 | Aydin et al. | 524/162 |
| 5,352,720 A | 10/1994 | Aydin et al. | 524/162 |
| 5,414,193 A | 5/1995 | Taylor et al. | 585/833 |
| 5,426,146 A | 6/1995 | Aydin et al. | 524/458 |
| 5,442,009 A | 8/1995 | Parker et al. | 524/555 |
| 5,576,384 A | 11/1996 | Nolken et al. | 524/806 |
| 5,705,571 A | 1/1998 | Tsiang et al. | 525/338 |
| 5,756,574 A | 5/1998 | Baumstark et al. | 524/460 |
| 5,994,457 A | 11/1999 | Stanger et al. | 524/800 |
| 6,020,439 A | 2/2000 | Ko et al. | 525/338 |
| 6,403,727 B1 | 6/2002 | Leube et al. | 525/338 |
| 6,410,657 B1 | 6/2002 | Ko et al. | 525/338 |
| 6,552,132 B2 | 4/2003 | Belt et al. | 525/338 |
| 6,566,457 B2 | 5/2003 | Barghoorn et al. | 525/339 |
| 6,635,718 B2 | 10/2003 | Belt et al. | 525/329.3 |
| 6,696,518 B1 | 2/2004 | Dersch et al. | 524/560 |
| 7,385,010 B2 * | 6/2008 | Rempel et al. | 525/338 |
| 7,696,282 B2 * | 4/2010 | Wei.beta. et al. | 525/338 |
| 2003/0088035 A1 | 5/2003 | Guerin et al. | 525/509 |
| 2003/0096913 A1 | 5/2003 | Guerin | 525/238 |
| 2004/0242800 A1 | 12/2004 | Takahashi et al. | 525/338 |
| 2006/0211827 A1 | 9/2006 | Rempel et al. | 525/329.1 |

FOREIGN PATENT DOCUMENTS

| | | |
|---|---|---|
| EP | 1 705 194 | 9/2006 |
| JP | 2001288212 | 10/2001 |
| JP | 2003126698 | 5/2003 |

OTHER PUBLICATIONS

Applied Catalysis A-General, vol. 276, No. 1-2, 2004, pp. 123-128, Lin, Pan, Rempel "Hydro-genation of nitrile-butadiene rubber latex with diimide".

Journal of Applied Polymer Science, vol. 96. No. 4, 2005, pp. 1122-1125, Lin, Pan Rempel "Gel Formation in Diimide-Hydrogenated Polymers".

Journal of Applied Polymer Science, vol. 65. No. 4, 1997, pp. 667-675, Guo, Rempel "Catalytic Hydrogenation of Nitrile-Butadiene Copolymer Emulsion".

Journal of Molecular Catalysis A: Chemical, vol. 123, No. 1, 1997, pp. 15-20, Mudalige, Rempel "Aqueous-phase hydrogenation of polybutadiene, styrene-butadiene, and nitrile-butadiene polymer emulsions catalyzed by water-soluble rhodium complexes".

Rubber Chemistry and Technology, vol. 68, No. 2, 1995, 281-286, Singha and Sivaram, "A New Method to Hydrogenate Nitrile Rubber in the Latex Form".

Journal of Molecular Catalysis A Chemical, vol. 231, No. 1-2, 2005, 93-101, Vasilis Kotzabasakis et al, "Catalytic conversions in aqueous media: a novel and efficient hydrogenation of polybutadiene-1,4-*block*-poly(ethylene oxide) catalyzed by Rh/TPPTS complexes in mixed micellar nanoreactors".

Ullmann's Encyclopedia of Ind. Chem. $5^{th}$ Ed., vol. A21 pp. 373-393, (no Author), "Polymerization Processes".

Houben-Weyl, Methoden der organischen Chemie, vol. XIV/1, Makromolekulare Stoffe, Georg Thieme Verlag, Stuttgart, 1961, 192-208, H. Logemann, "Allgemeines zur Polymerization in Hetrogener Phase".

* cited by examiner

*Primary Examiner*—Bernard Lipman
(74) *Attorney, Agent, or Firm*—Jennifer R. Seng

(57) ABSTRACT

The present invention relates to a process for the selective hydrogenation of the carbon-carbon double bonds in a diene-based polymer latex using a water-soluble catalyst and simultaneously a water-insoluble co-catalyst.

33 Claims, No Drawings

HYDROGENATION OF DIENE-BASED POLYMER LATEX

FIELD OF THE INVENTION

The present invention relates to a process for the selective hydrogenation of the carbon-carbon double bonds in diene-based polymers which are present in latex form using water-soluble catalysts.

BACKGROUND OF THE INVENTION

It is known that carbon-carbon double bonds in polymers may be successfully hydrogenated by treating the polymer in an organic solution with hydrogen in the presence of a catalyst. Such processes can be selective in the double bonds which are hydrogenated so that, for example, the double bonds in aromatic or naphthenic groups are not hydrogenated and double or triple bonds between carbon and other atoms such as nitrogen or oxygen are not affected. This field of art contains many examples of catalysts suitable for such hydrogenations, including catalysts based on cobalt, nickel, rhodium, ruthenium, osmium, and palladium. The suitability of the catalyst depends on the extent of hydrogenation required, the rate of the hydrogenation reaction and the presence or absence of other groups, such as carboxyl and nitrile groups, in the polymers. There have been already many patents and patent applications filed in this area, such as U.S. Pat. No. 6,410,657, 6,020,439, 5,705,571, 5,057,581, and 3,454,644.

However, many diene-based polymers, copolymers or terpolymers are made by emulsion polymerization processes and they are in latex form when they are discharged from polymerization reactors. Therefore it is very desirable to directly hydrogenate a diene-based polymer in latex form and this approach is receiving increasing attention in the recent decade. Many efforts have been made to realize such a process.

So far significant attention has been paid to the hydrogenation of C=C bonds using hydrazine or a derivative of hydrazine as a reducing agent together with an oxidant like oxygen, air or hydrogenperoxide. The hydrogen source to saturate the C=C bonds is then generated in-situ as a result of the redox reactions in which diimide is also formed as intermediate.

In U.S. Pat. No. 4,452,950 the latex hydrogenation is performed using the hydrazine hydrate/hydrogen peroxide (or oxygen) redox system to produce diimide in situ. $CuSO_4$ or $FeSO_4$ is used as a catalyst.

U.S. Pat. No. 5,039,737, and 5,442,009 provide a more refined latex hydrogenation process which treats the hydrogenated latex with ozone to break the cross-linked polymer chains which form during or after the latex hydrogenation using the diimide approach.

U.S. Pat. No. 6,552,132 B2 discloses that a compound can be added before, during or after the latex hydrogenation to break crosslinks formed during the hydrogenation using the diimide hydrogenation route. The compound can be chosen from primary or secondary amines, hydroxylamine, imines, azines, hydrazones and oximes.

U.S. Pat. No. 6,635,718 B2 describes the process for hydrogenating C=C bonds of an unsaturated polymer in the form of an aqueous dispersion by using hydrazine and an oxidizing compound in the presence of a metal compound containing a metal atom in an oxidation state of at least 4 (such as Ti(IV), V(V), Mo(VI) and W(VI)) as the catalyst.

In Applied Catalysis A-General, Vol. 276, no. 1-2, 2004, 123-128 and Journal of Applied Polymer Science, Vol. 96, no. 4, 2005, 1122-1125 detailed investigations relating to the hydrogenation of nitrile butadiene rubber latex via utilization of the diimide hydrogenation route are presented which cover examining hydrogenation efficiency and degree of hydrogenation. It has been found that there are side reactions at the interphase of the latex particles and within the polymer phase, which generate radicals to initiate the crosslinking of polymers in the latex form. Using radical scavengers did not show any evidence in helping to suppress the degree of gel formation.

Although there are methods developed to reduce the crosslinking, the aforementioned diimide route still encounters gel formation problem, especially when high hydrogenation conversion is achieved. Therefore, the resulting hydrogenated rubber mass is difficult to process or is unsuitable for further use because of its macroscopic three dimensional cross-linked structure.

U.S. Pat. No. 5,272,202 describes a process for the selective hydrogenation of the carbon-carbon double bonds of an unsaturated, nitrile-group-containing polymer with hydrogen in the presence of a hydrogenation catalyst being a palladium compound. In this process an aqueous emulsion of the unsaturated, nitrile-group-containing polymer is subjected to the hydrogenation and additionally an organic solvent capable of dissolving or swelling the polymer is used at a volume ratio of the aqueous emulsion to the organic solvent in a range of from 1:1 to 1:0.05. The aqueous emulsion is brought into contact with gaseous or dissolved hydrogen while maintaining an emulsified state.

U.S. Pat. No. 6,403,727 discloses a process for selectively hydrogenating C=C double bonds in polymers. Said process involves reacting the polymers with hydrogen in the presence of at least one hydrogenation catalyst selected from the salts and complex compounds of rhodium and/or of ruthenium, in an aqueous dispersion of the polymers which comprises up to 20% by volume of an organic solvent. The suitable rhodium containing catalysts are rhodium phosphine complexes of the formula $Rh\ X_m L^3 L^4 (L^5)_n$ wherein X is a halide, the anion of a carboxylic acid, acetylacetonate, aryl- or alkylsulfonate, hydride or the diphenyltriazine anion and $L^3$, $L^4$ and $L^5$ independently are CO, olefins, cycloolefins, dibenzophosphol, benzonitrile, $PR_3$ or $R_2P-A-PR_2$, m is 1 or 2 and n is 0, 1 or 2, with the proviso that at least one of $L^3$, $L^4$ or $L^5$ is one of the above mentioned phosphorus-containing ligands of the formula $PR_3$ or $R_2-A-PR_2$, wherein R is alkyl, alkyloxy, cycloalkyl, cycloalkyloxy, aryl or aryloxy. U.S. Pat. No. 6,566,457 makes use of the same principal technology of hydrogenating a polymer in latex form in the presence of a ruthenium and/or rhodium containing catalyst in order to prepare graft polymers.

JP 2001-288212 describes a further process for hydrogenating diene-based polymer latices. Latices of 2-chloro-1,3-butadiene (co)polymers are mixed with solutions or dispersions of catalysts in organic solvents which dissolve or swell the (co)polymers, and then contacted with hydrogen. The catalysts used are the so-called Wilkinson-catalysts having the formula $MeCl_a(P(C_6H_5)_3)_b$ wherein Me is a transition-metal, Cl is chlorine, b is an integer and equal to or bigger than 1 and a+b is an integer less than or equal to 6. In the Examples a latex of poly(2-chloro-1,3-butadiene) rubber having a $T_g$ of $-42°$ C. and an average number weight molecular weight $M_n$ of 150,000 was added to a toluene solution containing RhCl $(PPh_3)_3$ and $Ph_3P$, and hydrogenated at 100° C. and 5.0 MPa for 2 hours to give a hydrogenated polymer with $T_g=-54°$ C. and $M_n=120,000$.

In the Journal of Applied Polymer Science, Vol. 65, No. 4, 1997, 667-675 two processes for the selective hydrogenation of the C=C double bonds in nitrile-butadiene rubber ("NBR") emulsions are described, which are carried out in the presence of a number of RuCl$_2$(PPh$_3$)$_3$ complex catalysts. One of the processes is carried out in a homogeneous system, in which an organic solvent, which can dissolve the NBR polymer and the catalyst and which is compatible with the emulsion, is used. The other process is carried out in a heterogeneous system, in which an organic solvent which is capable of dissolving the catalyst and swelling the polymer particles but not miscible with the aqueous emulsion phase, is used. Both processes can realize quantitative hydrogenation of the C=C double bonds with the help of a certain amount of organic solvent to dissolve or swell the polymers.

U.S. Pat. No. 6,696,518 teaches a process for selective hydrogenation of nonaromatic C=C and C≡C bonds in polymers with hydrogen in the presence of at least one hydrogenation catalyst comprising ruthenium and/or rhodium and at least one nonionic phosphorus compound capable of forming a coordinative compound with the transition metal wherein the hydrogenation catalyst is incorporated into the aqueous dispersion of the polymer without adding a solvent. Ru and/or Ru complexes or Ru and/or Ru salts are suitable catalysts. Examples of preferred nonionic phosphorus compound are PR$_3$ or R$_2$P(O)$_x$Z(O)$_y$PR$_2$ [R represents e.g. C$_{1-10}$alkyl, C$_{4-12}$cycloalkyl, C$_{1-10}$alkoxy, aryl(oxy) and F; Z is a bivalent hydrocarbon residue; x, y=0.1]. For this special case, an acrylic acid-butadiene-styrene copolymer latex was firstly prepared by radical polymerization of a mixture of monomers also containing ruthenium(III) tris-2,4-pentanedionate, which means that the Ru-salt was dispersed into the monomer aqueous solution as the catalyst precursor before the polymerization. After having obtained the aqueous polymer dispersion, Bu$_3$P was added to the latex. The system was stirred for 16 h at ambient temperature followed by hydrogenation at 150° C. and 280 bar. The catalyst was synthesized in-situ, therefore no organic solvent was used to transport the catalyst. The hydrogenation is carried out in aqueous dispersions instead of in an organic medium, although the in-situ synthesized catalyst is oil-soluble.

In J. Molecular Catalysis Vol. 123, no. 1, 1997, 15-20 it is reported on the hydrogenation of polybutadiene (PBD), as well as polymers having styrene-butadiene repeating units (SBR) or having nitrile-butadiene repeating units (NBR) which are present in emulsions. Such hydrogenation is catalyzed by water-soluble rhodium complexes like e.g. [RhCl(HEXNa)$_2$]$_2$ (HEXNa=Ph$_2$P—(CH$_2$)$_5$—CO$_2$Na) and RhCl(TPPMS)$_3$ (TPPMS=monosulphonated-triphenylphosphine). The process, however, is carried out in the presence of some organic solvent. Under the conditions employed the catalyst is extracted into the organic phase during reaction. This is attributed to the phase transfer properties of the complex which is rendered by the amphiphilic HEXNa ligand.

In Rubber Chemistry and Technology Vol. 68, no. 2, 1995, 281-286 it is described to use a water-soluble analog of the Wilkinson catalyst, i.e. RhCl(TPPMS)$_3$ (where TPPMS represents monosulphonated-triphenylphosphine), for hydrogenation of nitrile rubber latex without any organic solvent and in the absence of any co-catalyst. The hydrogenation occurs under mild conditions (1 atm of hydrogen pressure, 75° C.) without coagulation of the latex, and up to 60% hydrogenation can be achieved. It is recognized that the hydrogenation was accompanied by an increase in gel content of the latex.

JP 2003-126698 A discloses a process for hydrogenating unsaturated polymer latices using a water soluble catalyst containing group VIII metals or their compounds and hydrophilic organic phosphine ligands in the absence of organic solvents. In the process as disclosed in the Examples, 0.133 mmol (as Rh) chloro(1.5-cyclooctadiene)rhodium dimer was stirred with 0.372 mmol of P(C$_6$H4SO$_3$Na)$_3$ to generate an aqueous solution of the complex catalyst. One part of such catalyst solution was mixed with five parts of butadiene rubber latex without organic solvent for hydrogenation. However, the highest degree of hydrogenation is only about 56% which is unsatisfactory for a scale-up to larger production volumes.

In the Journal of Molecular Catalysis A, Chemical, Vol. 231, no. 1-2, 2005, 93-101 it is reported to perform an aqueous phase hydrogenation of polybutadiene-1,4-block-poly(ethylene oxide) (PB-b-PEO) by using water-soluble Rh/TPPTS complexes, wherein TPPTS means P(C$_6$H$_4$-m-SO$_3^-$). The hydrogenation can be successful only because the PB-b-PEO has water-soluble parts within its polymer chains. In such a hydrogenation system, mixed micelles are formed by mixing the amphiphilic PB-b-PEO with added cationic surfactant dodecyl trimethyl ammonium chloride (DTAC) and n-hexane. Hydrogenation conversion can go up to 100% after one hour catalyzed by Rh/TPPTS complexes ([Rh]=10 ppm or less in aqueous phase) generated in situ from RhCl$_3$3H$_2$O and TPPTS under 80 to 100° C. and 20 bar of H$_2$. Their recycling experiment showed that the catalytic activity of the anionic catalytic system, Rh/P(C$_6$H$_4$-m-SO$_3^-$)$_3$, remained high in a consecutive run. The success of this hydrogenation system is mainly due to the fact that PB-b-PEO is an amphiphilic starting material. Therefore, the water-soluble catalyst works for systems which use amphiphilic polymer material.

JP 2003-096131 A discloses a method for the latex hydrogenation of conjugated diene polymers in the presence of Pd compounds as catalysts under basic conditions. NaOH is dissolved in palladium nitrate solution and mixed with a Mg silicate slurry to give a mixture (pH 12), which is then filtered, washed and dried to give a catalyst. Then, 0.45 part of the catalyst is added to 60 parts of 15% acrylonitrile-butadiene copolymer solution for hydrogenation at 50° C. with 5 MPa of H$_2$ for 6 hours to obtain 95% degree of hydrogenation. Gel formation information is not reported.

In US 2006/0211827 A1 a process for selectively hydrogenating nitrile-butadiene rubber latex without organic solvent is disclosed in which RhCl(PPh$_3$)$_3$ is used as water-insoluble catalyst and PPh$_3$ is used as water-insoluble co-catalyst. This process can achieve high degrees of hydrogenation and does not show gel formation. However, this method requires long reaction times and high loading of the transition metal for synthesis of the catalyst.

In summary, several technical routes have been attempted to hydrogenate C=C double bonds in polymers being present in the form of a latex, which include using hydrazine or a derivative of hydrazine as a reducing agent together with an oxidant like oxygen, air or hydroperoxide, directly using oil-soluble catalysts accompanied with a certain amount of organic solvents, and using catalysts containing water-soluble ligands. The hydrazine relevant route has encountered a significant gel formation problem, especially when a high hydrogenation conversion is required, and gel formation is not desired for post processing operations. In all prior art references relevant to using oil-soluble catalysts, a certain amount of organic solvent is still required in order to achieve a reasonable hydrogenation rate. The route relevant to using water-soluble catalysts has also encountered significant difficulty in overcoming the crosslinking problem.

The present invention therefore had the object to provide a novel and improved process allowing the hydrogenation of a diene-based polymer present as a latex without gel formation, simultaneously with a high degree of hydrogenation within acceptable short reaction times and with a reduced amount of the transition metal being used for synthesis of the catalyst.

SUMMARY OF THE INVENTION

The present invention provides a process for selectively hydrogenating carbon-carbon double bonds in a diene-based polymer comprising subjecting the diene-based polymer which is present in latex form to a hydrogenation in the presence of a water-soluble rhodium containing catalyst and a water-insoluble co-catalyst, but in the absence of any organic solvent.

DETAILED DESCRIPTION OF THE INVENTION

The process of the present invention allows a selective hydrogenation of the carbon—carbon double bonds which are present in a diene-based polymer. This means that, for example, the double bonds in aromatic or naphthenic groups are not hydrogenated and double or triple bonds between carbon and other atoms such as nitrogen or oxygen are also not affected.

The combination of using a water-soluble rhodium containing catalyst together with a water-insoluble co-catalyst in the absence of any organic solvent is important for the successful performance of the process pursuant to the present invention.

In a typical embodiment the water-solubility of the rhodium containing catalyst is caused by the fact, that the catalyst is a rhodium complex containing one or more water-soluble ligands, preferably at least two water-soluble ligands.

In the context of this invention and patent application the term "water-soluble catalyst" and "water-soluble ligand", respectively, shall mean that the catalyst or ligand is soluble in water at room temperature, i.e. 24+/−2° C. In particular a catalyst is considered as "water-soluble" if 0.5 or more parts by weight can be completely dissolved in 100 parts by weight of water at 24+/−2° C. Furtheron a catalyst or co-catalyst is considered as "water-insoluble" if 0.001 or less parts by weight can be completely dissolved in 100 parts by weight of water at 24+/−2° C.

Suitable water-soluble rhodium containing catalysts have e.g. the general formula (I)

$$RhQL_x \quad (I)$$

wherein

Q is a hydride or an anion other than a hydride,

L is a water-soluble ligand, and x is 1, 2, 3 or 4.

It has to be emphasized that the structure of the water-soluble ligand L is not limited. Such water-soluble ligand may e.g. be mono- or bidentate. In case of a monodentate ligand x is typically 2, 3, or 4, in case of a bidentate ligand x is typically 1 or 2 in general formula (I).

In one embodiment of the invention water-soluble rhodium containing catalysts of the general formula (I) are used wherein Q is a hydride or an anion other than a hydride, preferably a halide and more preferably a chloride or bromide ion, L is a water-soluble ligand having the general formula (II)

$$R^1{}_m B \quad (II)$$

wherein

R$^1$ is identical or different and represents an alkyl group, a cycloalkyl group, an aryl group, or an aralkyl group, wherein at least one of the groups R$^1$ is sulphonated one or more times, B is phosphorus, arsenic, sulfur, or a sulphoxide group S=O, and m is 2 or 3, and x is 2, 3 or 4, preferably 3 when Q is a halide and preferably 4 when Q is a hydride.

Preferably water-soluble rhodium containing catalysts of the general formula (I) are used wherein Q is a hydride or an anion other than a hydride, more preferably a halide and even more preferably a chloride or bromide ion, L is a water-soluble ligand having the general formula (II)

$$R^1{}_m B \quad (II)$$

wherein

R$^1$ is identical or different and represents a $C_1$-$C_8$-alkyl group, a $C_4$-$C_8$-cycloalkyl group, a $C_6$-$C_{15}$-aryl group or a $C_7$-$C_{15}$-aralkyl group, wherein at least one of the groups R$^1$ is sulphonated one or more times, B is phosphorus, arsenic, sulfur, or a sulphoxide group S=O, and m is 2 or 3 and x is 2, 3 or 4, preferably 3 when Q is halide and preferably 4 when Q is hydride.

At least one of the groups R$^1$ must be one or more times sulphonated, in particular at least one of the groups R$^1$ is one, two or three times sulphonated. In particular embodiments of the present invention more than one of the groups R$^1$, e.g. two or three groups R$^1$, are one or more times sulphonated, in particular one, two or three times sulphonated each.

In a further embodiment the present process is carried out using

RhCl(TPPMS)$_3$ (with TPPMS representing monosulphonated-triphenylphosphine, i.e. P(C$_6$H$_5$)$_2$(m-C$_6$H$_4$SO$_3{}^-$))

RhCl(TPPTS)$_3$ (with TPPTS representing trisulphonated-triphenylphosphine, i.e. tris(3-sulfophenyl)phosphine, P(C$_6$H$_4$—3—SO$_3{}^-$)$_3$)

as rhodium-containing catalysts which are soluble in water at room temperature, i.e. 24+/−2° C. The counterion of the sulphonate groups is typically an alkali metal ion e.g. a sodium or potassium ion.

In an alternative embodiment of this invention water-soluble rhodium containing catalysts of the general formula (I) are used wherein Q is a hydride or an anion other than a hydride, preferably a halide and more preferably a chloride or bromide ion, L is a water-soluble ligand having the general formula (III)

$$R^2{}_n C\text{-}A\text{-}C R^3{}_n \quad (III)$$

in which

R$^2$ is identical or different and represents an alkyl group, an cycloalkyl group, an aryl group, or an aralkyl group, R$^3$ is identical or different and represents an alkyl group, an cycloalkyl group, an aryl group or an aralkyl group, under the proviso that at least one of the groups R$^2$ or R$^3$ is sulphonated one or more times, C is phosphorus, or arsenic, A represents a spacer group, preferably phenylene or a $C_1$-$C_{20}$alkylene group or a single bond, and n is 2 and x is 1 or 2.

More preferably water-soluble rhodium containing catalysts of the general formula (I) are used wherein Q is a hydride or an anion other than a hydride, preferably a halide and more preferably a chloride or bromide ion, L is a water-soluble ligand having the general formula (III)

$$R^2{}_n C\text{-}A\text{-}C\, R^3{}_n \tag{III}$$

in which

R$^2$ is identical or different and represents a C$_1$-C$_8$-alkyl group, a C$_4$-C$_8$-cycloalkyl group, a C$_6$-C$_{15}$-aryl group or a C$_7$-C$_{15}$-aralkyl group, R$^3$ is identical or different and represents a C$_1$-C$_8$-alkyl group, a C$_4$-C$_8$-cycloalkyl group, an C$_6$-C$_{15}$-aryl group or a C$_7$-C$_{15}$-aralkyl group, under the proviso that at least one of the groups R$^2$ or R$^3$ is sulphonated one or more times, C is phosphorus, or arsenic, A represents a spacer group, more preferably phenylene or a C$_1$-C$_8$-alkylene group or a single bond, n is 2 and x is 1 or 2.

At least one of the groups R$^2$ or R$^3$ must be one or more times sulphonated. In one embodiment of the present invention one or both groups R$^2$ are sulphonated one, two or three times. In another embodiment of the present invention one or both of the groups R$^2$ and simultaneously one or both of the groups R$^3$ are sulphonated one, two or three times.

For the purposes of the present patent application the term "alkyl" shall mean any branched or unbranched hydrocarbon residue and unless otherwise specified shall encompass C$_1$-C$_{20}$-alkyl, e.g. methyl, ethyl, n-propyl, isopropyl, n-butyl, sec-butyl, tert-butyl, n-pentyl, 1-methylbutyl, 2-methylbutyl, 3-methylbutyl, neopentyl, 1-ethylpropyl, n-hexyl, n-heptyl, n-octyl, n-decyl or n-dodecyl.

For the purposes of the present patent application the term "cycloalkyl" shall encompass C$_3$-C$_{10}$-cycloalkyl groups, like e.g. cyclopropyl, cyclobutyl, cyclopentyl, cyclohexyl, cycloheptyl and cyclooctyl.

For the purposes of the present patent application the term "aryl" encompasses an aromatic radical having from 6 to 24 skeletal carbon atoms. Preferred monocyclic, bicyclic or tricyclic carbocyclic aromatic radicals having from 6 to 10 skeletal carbon atoms are, for example, phenyl, biphenyl, naphthyl phenanthrenyl and anthracenyl.

The term "substituted" used for the purposes of the present patent application means that a hydrogen atom on an indicated radical or atom has been replaced by one of the groups indicated in each case, with the proviso that the valency of the atom indicated is not exceeded and the substitution leads to a stable compound.

For the purposes of the present patent application and invention, all the definitions of radicals, parameters or explanations given above or below in general terms or in preferred ranges can be combined with one another in any way, i.e. including combinations of the respective ranges and preferred ranges.

Additionally to the water-soluble rhodium containing catalyst a co-catalyst is used in the process pursuant to this invention. Contrary to the rhodium-containing catalyst the co-catalysts used in the present invention are insoluble in water.

In one embodiment a co-catalyst of the general formula (IV) is used $$R^4{}_o D \tag{IV}$$

wherein

R$^4$ is identical or different and represents alkyl, preferably C$_1$-C$_8$-alkyl, aryl, preferably C$_6$-C$_{15}$-aryl, cycloalkyl, preferably C$_4$-C$_8$-cycloalkyl or aralkyl, preferably C$_7$-C$_{15}$-aralkyl, D is phosphorus, arsenic, sulfur, or a sulphoxide group S=O, and o is 2 or 3.

In another embodiment a co-catalyst pursuant to formula (IV) is used wherein

R$^4$ is identical or different and represents alkyl, preferably C$_1$-C8-alkyl, aryl, preferably C$_6$-C$_{15}$-aryl, cycloalkyl, preferably C$_4$-C$_8$-cycloalkyl or aralkyl, preferably C$_7$-C$_{15}$-aralkyl, D is phosphorus and o is 3.

Suitable water-insoluble co-catalysts pursuant to formula (IV) are triaryl-, trialkyl-, tricycloalkyl-, diaryl monoalkyl-, dialkyl monoaryl-, diaryl monocycloalkyl-, dialkyl monocycloalkyl-, dicycloalkyl monoaryl- or dicycloalkyl monoaryl phosphines.

In an alternative embodiment of this invention a co-catalyst of the general formula (V) is used wherein $$R^5{}_p E\text{-}A\text{-}E\, R^6{}_p \tag{V}$$

in which

R$^5$ is identical or different and represents an alkyl group, a cycloalkyl group, an aryl group or an aralkyl group, R$^6$ is identical or different and represents an alkyl group, a cycloalkyl group, an aryl group or an aralkyl group, E is phosphorus, or arsenic, A represents a spacer group, preferably phenylene or a C$_1$-C$_{20}$alkylene group or a single bond, and p is 2.

In an even more preferred embodiment of this invention a co-catalyst of the general formula (V) is used wherein R$^5$ is identical or different and represents a C$_1$-C$_8$-alkyl group, a C$_4$-C$_8$-cycloalkyl group, a C$_6$-C$_{15}$-aryl group or a C$_7$-C$_{15}$-aralkyl group, R$^6$ is identical or different and represents a C$_1$-C$_8$-alkyl group, a C$_4$-C$_8$-cycloalkyl group, a C$_6$-C$_{15}$-aryl group or a C$_7$-C$_{15}$-aralkyl group, E is phosphorus, or arsenic, A represents a spacer group, more preferably phenylene or a C$_1$-C$_8$-alkylene group or a single bond, and p is 2.

Examples of suitable water-insoluble co-catalysts are also given in U.S. Pat. No. 4,631,315, the disclosure of which is incorporated by reference as far as allowed by the respective jurisdiction. The most preferred co-catalyst is triphenylphosphine.

A preferred embodiment of the present process comprises selectively hydrogenating carbon-carbon double bonds in a diene-based polymer wherein the diene-based polymer is present in latex form and the hydrogenation is carried out in the absence of any organic solvent and in the presence of a water-soluble rhodium catalyst of the general formula (I)

$$RhQL_x \tag{I}$$

wherein

Q is a hydride or an anion other than a hydride, preferably a halide and more preferably a chloride or bromide ion, and L has either the general formula (II)

$$R^1{}_m B \tag{II}$$

wherein
R¹ is identical or different and represents a $C_1$-$C_8$-alkyl group, a $C_4$-$C_8$-cycloalkyl group, a $C_6$-$C_{15}$-aryl group or a $C_7$-$C_{15}$-aralkyl group, wherein at least one of the groups R¹ is sulphonated one or more times,
B is phosphorus, arsenic, sulfur, or a sulphoxide group S=O, and
m is 2 or 3,
or L has the general formula (III)

$$R^2_n C\text{-}A\text{-}C\, R^3_n \qquad (III)$$

wherein
R² is identical or different and represents a $C_1$-$C_8$-alkyl group, a $C_4$-$C_8$-cycloalkyl group, a $C_6$-$C_{15}$-aryl group or a $C_7$-$C_{15}$-aralkyl group,
R³ is identical or different and represents a $C_1$-$C_8$-alkyl group, a $C_4$-$C_8$-cycloalkyl group, a $C_6$-$C_{15}$-aryl group or a $C_7$-$C_{15}$-aralkyl group, under the proviso that least one of the groups R² or R³ is sulphonated one or more times,
C is phosphorus, or arsenic,
A represents a spacer group, preferably phenylene or a $C_1$-$C_{20}$alkylene group or a single bond, and
n is 2 and wherein
x is 1, 2, 3 or 4, and in the presence of a water-insoluble co-catalyst having either the general formula (IV)

$$R^4_o D \qquad (IV)$$

wherein
R⁴ is identical or different and represents alkyl, more preferably $C_1$-$C_8$-alkyl, aryl, more preferably $C_6$-$C_{15}$-aryl, cycloalkyl, more preferably $C_4$-$C_8$-cycloalkyl or aralkyl, more preferably $C_7$-$C_{15}$-aralkyl,
D is phosphorus, arsenic, sulfur. or a sulphoxide group S=O, and
o is 2 or 3 or the general formula (V)

$$R^5_p E\text{-}A\text{-}E\, R^6_p \qquad (V)$$

wherein
R⁵ is identical or different and represents a $C_1$-$C_8$-alkyl group, a $C_4$-$C_8$-cycloalkyl group, a $C_6$-$C_{15}$-aryl group or a $C_7$-$C_{15}$-aralkyl group,
R⁶ is identical or different and represents a $C_1$-$C_8$-alkyl group, a $C_4$-$C_8$-cycloalkyl group, a $C_6$-$C_{15}$-aryl group or a $C_7$-$C_{15}$-aralkyl group,
E is phosphorus, or arsenic,
A represents a spacer group, more preferably phenylene or a $C_1$-$C_8$-alkylene group or a single bond, and
p is 2

The amount of the water-soluble rhodium containing catalyst to be used is not critical. It is possible to use the catalyst in very small quantities. An amount in the range of from 0.01% b.w. to 5.0% b. w., preferably of from 0.02% b.w. to 2.0% b.w., based on the weight of the polymer solid content of the latex is typically used.

The water-insoluble co-catalyst is typically used in an amount up to 5000% by weight, preferably in a range of from 500% b.w. to 3000% b.w., based on the weight of water-soluble catalyst.

Suitable substrates for the hydrogenation process of the present invention are in principle all aqueous dispersions of polymers having ethylenically unsaturated double bonds, which are also called "latex". These include both dispersions prepared by free-radical polymerization of aqueous monomer emulsions (primary dispersions) and those whose polymers are prepared by another route and are then converted to an aqueous dispersion form (secondary dispersions). The term polymer dispersion also embraces, in principle, dispersions of microcapsules.

Polymers having carbon—carbon double bonds which may be subjected to the inventive process comprise repeating units based on at least one conjugated diene monomer.

The conjugated diene can be of any nature. In one embodiment ($C_4$-$C_6$) conjugated dienes are used. Preference is given to 1,3-butadiene, isoprene, 1-methylbutadiene, 2,3-dimethylbutadiene, piperylene, chloroprene, or mixtures thereof. Particular preference is given to 1,3-butadiene and isoprene or mixtures thereof. Especial preference is given to 1,3-butadiene.

In a further embodiment polymers having carbon-carbon double bonds may be subjected to the inventive process which comprise repeating units of at least one conjugated diene as monomer (a) and at least one further copolymerizable monomer (b).

Examples of suitable monomers (b) are olefins, such as ethylene or propylene.

Further examples of suitable monomers (b) are vinylaromatic monomers, such as styrene, alpha-methyl styrene, o-chlorostyrene or vinyltoluenes, vinylesters of aliphatic or branched $C_1$-$C_{18}$monocarboxylic acids, such as vinyl acetate, vinyl propionate, vinyl butyrate, vinyl valerate, vinyl hexanoate, vinyl 2-ethylhexanoate, vinyl decanoate, vinyl laurate and vinyl stearate.

One preferred polymer to be used in the present invention is a copolymer of 1,3-butadiene and styrene or alpha-methylstyrene. Said copolymers may have a random or block type structure.

Further examples of suitable monomers (b) are ethylenically unsaturated monocarboxylic or dicarboxylic acids, like e.g. acrylic acid, methacrylic acid, fumaric acid, maleic acid and itaconic acid, esters of ethylenically unsaturated mono- or dicarboxylic acids such as acrylic acid, methacrylic acid, maleic acid, fumaric acid and itaconic acid with generally $C_1$-$C_{12}$alkanols, such as methanol, ethanol, n-propanol, isopropanol, 1- butanol, 2-butanol, isobutanol, tert-butanol, n-hexanol, 2-ethylhexanol, or $C_5$-$C_{10}$cycloalkanols, such as cyclopentanol or cyclohexanol, and of these preferably the esters of acrylic and/or methacrylic acid, examples being methyl methacrylate, n-butyl methacrylate, tert-butyl methacrylate, n-butyl acrylate, tert-butyl acrylate, and 2-ethylhexyl acrylate.

Further examples of suitable copolymerizable monomers (b) are α,β-unsaturated nitriles. It is possible to use any known α,β-unsaturated nitrile, preferably a ($C_3$-$C_5$) α,β-unsaturated nitrile such as acrylonitrile, methacrylonitrile, ethacrylonitrile or mixtures thereof. Particular preference is given to acrylonitrile.

A particularly suitable copolymer to be used in the present invention is a nitrile rubber (also abbreviated as "NBR") this being a copolymer of an α,β-unsaturated nitrile, particularly preferred acrylonitrile, and a conjugated diene, particularly preferred 1,3-butadiene and optionally one or more further copolymerizable monomers, such as α,β-unsaturated monocarboxylic or dicarboxylic acids, their esters or amides.

As α,β-unsaturated monocarboxylic or dicarboxylic acids in such nitrile rubbers preference is given to fumaric acid, maleic acid, acrylic acid and methacrylic acid.

As esters of α,β-unsaturated carboxylic acids in such nitrile rubbers preference is given to using their alkyl esters and alkoxyalkyl esters. Particularly preferred alkyl esters of α,β-unsaturated carboxylic acids are methyl acrylate, ethyl acrylate, propyl acrylate, n-butyl acrylate, tert-butyl acrylate, propyl methacrylate, n-butyl methacrylate, tert-butyl methacrylate, 2-ethylhexyl acrylate, 2-ethylhexyl methacrylate and octyl acrylate. Particularly preferred alkoxyalkyl esters of α,β-unsaturated carboxylic acids are methoxyethyl (meth) acrylate, ethoxyethyl (meth)acrylate and methoxyethyl (meth)acrylate. It is also possible to use mixtures of alkyl esters, e.g. those mentioned above, with alkoxyalkyl esters, e.g. in the form of those mentioned above.

A preferred terpolymer to be used in the present invention is a terpolymer of acrylonitrile, 1,3-butadiene and a third monomer selected from the group consisting of fumaric acid, maleic acid, acrylic acid, methacrylic acid, n-butyl acrylate and tert-butyl acrylate.

In case that the polymer to be subjected to hydrogenation comprises not only repeating units of one or more conjugated dienes, but also repeating units of one or more further copolymerizable monomers, the proportions of conjugated diene(s) and the other copolymerizable monomers may vary within wide ranges:

In case of NBR polymers being used for hydrogenation the proportion of or of the sum of the conjugated dienes is usually in the range from 40 to 90% by weight, preferably in the range from 50 to 85% by weight, based on the total polymer. The proportion of or of the sum of the α,β-unsaturated nitriles is usually from 10 to 60% by weight, preferably from 15 to 50% by weight, based on the total polymer. The proportions of the monomers in each case add up to 100% by weight. Additional termonomers may optionally be present. If used, they are typically present in amounts of from greater than 0 to 40% by weight, preferably from 0.1 to 40% by weight, particularly preferably from 1 to 30% by weight, based on the total polymer. In this case, corresponding proportions of the conjugated diene(s) and/or of the α,β-unsaturated nitrile(s) are replaced by the proportions of the additional termonomers, with the proportions of all monomers in each case adding up to 100% by weight.

The preparation of nitrile rubbers by polymerization of the abovementioned monomers is adequately known to those skilled in the art and is comprehensively described in the polymer literature.

Nitrile rubbers which can be used for the purposes of the invention are also commercially available, e.g. as products from the product range of the trade names Perbunan® and Krynac® from Lanxess Deutschland GmbH.

In another embodiment of the invention it is possible to use nitrile rubbers which have been subjected to a metathesis reaction in order to decrease their molecular weight. Such metathesis reaction is known in the art and e.g. disclosed in WO-A-02/100905 and WO-A-02/100941.

The nitrile rubbers which may be used pursuant to this invention have a Mooney viscosity (ML 1+4 at 100° C.) in the range of from 3 to 75, preferably 5 to 75, more preferably 20 to 75, even more preferably 25 to 70, and particularly preferred from 30 to 50. The weight average molecular weight $M_w$ lies in the range of from 25,000-500,000, preferably in the range of from 200,000-500,000, more preferably in the range 200,000-400,000. A nitrile rubber having a Mooney viscosity of e.g. about 34 has an intrinsic viscosity, determined in chlorobenzene at 35° C., of about 1.1 dL/g. The nitrile rubbers used also have a polydispersity $PDI=M_w/M_n$, where $M_w$ is the weight average molecular weight and $M_n$ is the number average molecular weight, in the range of from 1.5 to 6.0, preferably of from 1.8 to 6.0, more preferably of from 1,9 to 6.0 and even more preferably in the range of from 2.0 to 4.0. The determination of the Mooney viscosity is carried out in accordance with ASTM standard D 1646.

If a polymer other than a nitrile rubber is used in the present invention which contains repeating units of one or more conjugated dienes and one or more other copolymerizable monomers like e.g. styrene or alpha-methylstyrene the proportion of the conjugated diene(s) is usually from 15 to less than 100% b.w. and the proportion of or of the sum of the copolymerizable monomer(s) is from greater than 0 to 85 % b.w. with the proportion of all monomers in each case adding up to 100%. If styrene or alphamethyl styrene are used as other copolymerizable monomers, the proportion of styrene and/or a methyl styrene is preferably from 15 to 60% b.w., while the remainder to 100% b.w. is represented by the conjugated diene(s).

The carbon—carbon double bond containing polymer in the latex form useful in the present invention may be prepared by any method known to those skilled in the art, such as emulsion polymerization, solution polymerization or bulk polymerization. Preferably, the carbon—carbon double bond containing polymer useful in the present invention is prepared in an aqueous emulsion polymerization process as this process directly yields the latex form of the polymer. The latex typically represents a colloidal dispersion of the polymer in water.

Preferably, according to the present invention, the polymer content in the aqueous dispersion lies in the range of from 1 to 75% by weight, more preferably from 5 to 30% by weight based on the total weight of the aqueous dispersion.

The preparation of such polymers which are subjected to the process pursuant to this invention is known to a person skilled in the art and can in principle be carried out by anionic, free-radical or Ziegler-Natta polymerization in solution, in bulk, in suspension or in emulsion. Depending on the type of reaction, the conjugated dienes are 1,4- and/or 1,2 polymerized. For the hydrogenation process of the invention it is preferred to employ polymers prepared by free-radical aqueous emulsion polymerization of the above mentioned monomers (a) and (b). Such a polymerization technique is well known to persons skilled in the art and is described for example in Ullmann's Encyclopedia of Industrial Chemistry, $5^{th}$ Edition, Volume A 21, pp 373-393. In general such polymers are prepared in the presence of free-radical initiators. Additionally surface-active substances such as emulsifiers and protective colloids are used, if desired (see for example Houben Weyl, Methoden der organischen Chemie, Volume XIV/1, Makromolekulare Stoffe, Georg Thieme Verlag, Stuttgart, 1961, 192-208).

Suitable free-radical polymerization initiators include organic peroxides, such as tert-butyl hydroperoxide, benzoyl hydroperoxide, diisopropylbenzoyl peroxide, inorganic peroxides, such as hydrogen peroxide, salts of peroxomono and/or peroxodisulfuric acid, especially the ammonium and/or alkali metal peroxodisulfates (persulfates), and azo compounds, particular preference being given to the persulfates. Preference is also given to combined systems composed of at least one organic reducing agent and at least one peroxide and/or hydroperoxide, such as tert-butyl hydroperoxide and the sodium salt of hydroxymethanesulfonic acid, or hydrogen peroxide and ascorbic acid (as an electrolyte-free redox initiator system) and to combine systems which additionally comprise a small amount of a metal compound which is soluble in the polymerization medium and whose metallic component can exist in a plurality of valence states, for example ascorbic acid/iron(II) sulfate/hydrogen peroxide, it also being possible frequently to replace the ascorbic acid by the sodium salt of hydroxymethanesulfinic acid, sodium sulfite, sodium hydrogensulfite or sodium bisulfite and the hydrogen peroxide by tert-butyl hydroperoxid, alkali metal peroxodisulfates and/or ammonium peroxodisulfate. Instead of a water-soluble iron(II) salt it is also possible to employ a combination of water-soluble Fe/V salts.

These polymerization initiators are employed in customary amounts, such as in amounts of from 0.01 to 5, preferably from 0.1 to 2.0% b.w., based on the monomers to be polymerized. The monomer mixtures can, if desired, be polymerized in the presence of customary regulators, such as mercaptans, an example of which is tert-dodecyl mercaptan manufactured by various companies including Lanxess Deutschland GmbH. These regulators are then used in an amount of from 0.01 to 5% b.w., based on the overall amount of the mixture.

There are no particular restrictions on the emulsifiers that can be used. Preference is given to neutral emulsifiers such as ethoxylated mono, di- and trialkylphenols (ethyleneoxide degree: 3 to 50; alkyl: $C_4$ to $C_9$) or ethoxylated fatty alcohols (ethyleneoxide degree: 3 to 50; alkyl: $C_4$ to $C_9$) and/or anionic emulsifiers, such as the alkali metal and ammonium salts of fatty acids (alkyl: $C_{12}$ to $C_{24}$), of alkyl sulfates (alkyl: $C_8$ to $C_{22}$), of sulfuric monoesters of ethoxylated alkanols (ethyleneoxide degree: 4 to 30, alkyl: $C_8$ to $C_{22}$) and of ethoxylated alkylphenols (ethyleneoxide degree: 3 to 50, alkyl: $C_4$ to $C_{20}$), of alkylsulfonic acids (alkyl: $C_8$ to $C_{22}$) and of alkylarylsulfonic acids (alkyl: $C_4$ to $C_{18}$). Further suitable anionic emulsifiers are alkali metal or ammonium salts of mono- or di-$C_{4-24}$alkyl derivatives of bis(phenylsulfonic acid)ether.

Particular preference is given to the alkali metal and/or ammonium salts, especially the sodium salts, of alkylarylsulfonic acids, alkylsulfonic acids (eg. sulfonated $C_{12}$-$C_{18}$ paraffin), alkylsulfates (eg. sodium lauryl sulfonate) and of the sulphuric monoesters of ethoxylated alkanols (eg. sulfoxylated ethoxylate of lauryl alcohol with 2 to 3 ethyleneoxide units). Further suitable emulsifiers are the sodium or potassium salts of fatty acids ($C_{12}$-$C_{23}$-alkyl radicals), such as potassium oleate. Additional appropriate emulsifiers are given in Houben-Weyl, loc. Cit., pp. 192-208. Instead of or in a mixture with emulsifiers it is also possible, however, to employ conventional protective colloids, such as polyvinyl alcohol, polyvinylpyrrolidone or amphiphilic block polymers with short hydrophobic blocks, for the purpose of co-stabilization. In general the amount of emulsifiers used, based on the monomers to be polymerized, will not exceed 5% by weight.

The free-radical polymerization reaction can be carried out by the whole-batch initial charge (batch) technique, but is preferably operated, especially on the industrial scale, in accordance with the feed technique. In this latter technique the major amount (generally from 50 to 100% by weight) of the monomers to be polymerized are added to the polymerization vessel in accordance with the progress of the polymerization of the monomers already in the polymerization vessel. In this context; the free-radical initiator system can be either included entirely in the initial charge to the polymerization vessel or else added continuously or in stages to the polymerization reaction at the rate at which it is consumed in the course of the free-radical aqueous emulsion polymerization. In each individual case this will depend, as is known, both on the chemical nature of the initiator system and on the polymerization temperature. The initiator system is preferably supplied to the polymerization zone at the rate at which it is consumed.

The polymerization reaction may also be conducted in the presence of an aqueous polymer dispersion as polymer (seed latex). Such techniques are fundamentally known to the skilled worker and are described for example, in DE-A 42 13 967, DE-A 42 13 968, EP-A-0 567 811, EP-A-0 567 812 or EP-A-0 567 819. In principle it is possible depending on the desired character, to include the seed in the initial charge or to add it continuously or in stages in the course of polymerization. The polymerization is preferably carried out with the seed in the initial charge. The amount of seed polymer is preferably in the range from 0.05 to 5% by weight, preferably from 0.1 to 2% by weight and, in particular, from 0.2 to 1% by weight, based on the monomers a) to d). The polymer particles of the seed latex that is used preferably have weight-average diameters in the range from 10 to 100 nm, preferably from 20 to 60 nm and in particular, about 30 nm. Preference is given to the use of polystyrene seeds. The polymerization reaction is preferably carried out above atmospheric pressure. The polymerization time can vary within a wide range, and is generally from 1 to 15 hours, preferably from 3 to 10 hours. The temperature of polymerization is also variable a wide range and, depending on the initiator used, is from about 0 to 110° C.

The polymer dispersions prepared in this way generally have solid contents of up to 75% by weight. For use in the hydrogenation process of the invention it is possible to employ the dispersions with these solid contents. In some cases, however, it is advisable to dilute the dispersions to an appropriate solid content beforehand. The solid content of the dispersions employed is preferably in the range from 5 to 60% by weight, based on the overall weight of dispersion.

The surface-active substances still present, in general, in the polymer dispersions, and further substances used, for example, as customary polymerization auxiliaries in emulsion polymerizations, do not have a disruptive effect on the hydrogenation process of the invention. However, it may be advisable to subject the polymer dispersions to chemical or physical deodorization before hydrogenation. Physical deodorization, by stripping the residual monomers with steam, is known, for example, from EP-A-0 584 458. EP-A-0 327 006 for its part recommends the use of conventional distillation methods. Chemical deodorization takes place preferably by means of a post polymerization following the main polymerization. Such processes are described, for example, in DE-A 383 4734, EP-A-0 379 892, EP-A-0 327 006, DE-A 44 19 518, DE-A 4435 422 and DE-A 44 35 423.

The hydrogenation process of the present invention may optionally be carried out in the presence of ammonium salts like e.g. cetyl trimethyl ammonium bromide (CTAB).

The hydrogenation process of the present invention is preferably carried out with hydrogen gas at a pressure of from 0.1 to 20 MPa, preferably at a pressure of from 1 to 16 MPa. In one embodiment of the present process said hydrogen gas is essentially pure.

The process of the present invention can be undertaken in a suitable reactor equipped with temperature regulating and agitating means. According to the present invention the polymer latex can be fed into the reactor and degassed as required; the catalyst can then be added as a pure material or in some cases as the in-situ product of $RhCl_3.3H_2O$ and the water-soluble ligands. The reactor can then be pressurized with hydrogen or, in the alternative, the reactor can be pressurized with hydrogen and the catalyst added as a pure material or as an aqueous solution. Or, according to the present invention, the catalyst can be added as a pure material or as an aqueous solution into reactor, and then the polymer latex can be fed into the reactor and degassed as required.

Typically the reactor device is heated and the polymer latex before the catalyst is added. The hydrogenation temperature suitable for the present invention is from 35° C. to 180° C., preferably from 80° C. to 160° C.

During the course of the hydrogenation reaction the hydrogen may be added to the reactor. The reaction time is from about one quarter of an hour to about 100 hours, depending on operational conditions. The extent to which the carbon-carbon double bonds in the polymer can be hydrogenated is from 80 to 99.5%, preferably from 90 to 99.5%.

When the hydrogenation reaction is complete to the extent desired, the reaction vessel can be cooled and vented. The resultant hydrogenated latex can be used in latex form if required or be coagulated and washed, to obtain the hydrogenated polymer in solid form.

Hydrogenated nitrile rubbers obtained pursuant to this invention have a Mooney viscosity (ML 1+4 at 100° C.) in the range of from 6 to 150, preferably in the range of from 25 to 100, more preferably in the range of from 35 to 100, and even more preferred in the range of from 39 to 100 and particulary preferred in the range of from 40 to 100.

EXAMPLES

The following examples with the experimental conditions shown in Table 2 illustrate the scope of the invention and are not intended to limit the same.

The materials which were used in the hydrogenation reactions are listed in Table 1.

TABLE 1

| Specification of the Materials | |
|---|---|
| Material | Supplier |
| Butadiene-acrylonitrile polymer latex (Perbunan ® T 3429, solid content 14.3% b.w.; containing 66% butadiene and 34% acrylonitrile; Mooney viscosity (ML 1 + 4 at 100° C.) of about 29; mean diameter of the polymer particles in the latex of about 75 nm) | Lanxess Inc. |
| RhCl(TPPMS)$_3$ | Synthesized according to literature (A. W. Heinen Rogers, A. Sheldon in "Journal of Molecular Catalysis A: Chemical 142 1999 17-26") |
| Triphenylphosphine (99%) | Strem Chemicals |
| Hydrogen (99.999%) and nitrogen (99.999%) | Praxair |
| Methyl ethyl ketone (99.8%) | Fisher Scientific |

Example C1

Comparison, No Co-Catalyst

A 300 ml glass lined stainless steel autoclave having temperature control means, an agitator and hydrogen gas addition point were used. 50 ml of the aforementioned butadiene-acrylonitrile polymer latex, 50 ml water, 0.0386 g of the catalyst RhCl(TPPMS)$_3$ and no PPh$_3$ were charged into the reactor. The latex was then degassed with nitrogen. The temperature was increased to 145° C. and hydrogen was introduced up to 8.6 MPa.

After 18 hours, the hydrogenation degree reaches 30%. Gel was generated and the resultant polymer is not soluble in methyl ethyl ketone.

Example 2

Inventive

The same procedure as described in Example 1 was employed. However, 25 ml latex, 75 ml water, 0.0373 g of catalyst and 0.358 g of PPh$_3$, were used and 6.8 MPa of hydrogen pressure and 145° C. were applied.

After 45 hours a 94% hydrogenation degree was achieved and no gel was generated.

Example C3

Comparison; No Co-Catalyst

The same procedures as described in Example 1 were employed. However, 25 ml latex, 75 ml additional water, 0.0375 g of catalyst, and no PPh$_3$ were used and 6.8 MPa of hydrogen pressure and 160° C. were applied.

After 21 hours a 43% hydrogenation degree was achieved and gel was generated.

Example 4

Inventive

The same procedures as described in Example 1 were employed. However, 25 ml latex, 75 ml water, 0.0374 g of catalyst and 0.358 g of PPh$_3$ were used and 6.8 MPa of hydrogen pressure and 160° C. were applied.

After 21 hours a 92% hydrogenation degree was achieved and no gel was generated.

Example 5

Inventive

The same procedures as described in Example 1 were employed. However, 25 ml latex, 75 ml additional water. 0.0097 g of catalyst and 0.358 g of PPh$_3$ were used and 6.8 MPa of hydrogen pressure and 160° C. were applied.

After 24 hours a 83% hydrogenation degree was achieved and no gel was generated.

Example 6

Inventive

The same procedures and conditions as described in Example 5 were employed except 0.0295 g catalyst was used.

After 23 hours a 81% hydrogenation degree was achieved and no gel was generated.

Example 7

Inventive

The same procedures as described in Example 1 were employed. However, 25 ml latex, 75 ml water, 0.0374 g of catalyst, 0.358 g of PPh$_3$ and 0.4 g cetyl trimethyl ammonium bromide (CTAB) were used and 6.8 MPa of hydrogen pressure and 160° C. were applied.

After 22 hours a 76% hydrogenation degree was achieved and no gel was generated.

TABLE 1

Experimental Conditions for the hydrogenation of nitrile-nutadiene rubber in latex form

| Example | Latex [ml] | Water [ml] | Catalyst | $W_{cat}$ [g] | PPh$_3$ [g] | $P_{H2}$ [MPa] | T [° C.] | Hydrog. time [h] | HD [%] |
|---|---|---|---|---|---|---|---|---|---|
| C1 | 50 | 50 | RhCl(TPPMS)$_3$ | 0.0386 | 0 | 8.6 | 145 | 18 | 30 |
| 2 | 25 | 75 | RhCl(TPPMS)$_3$ | 0.0373 | 0.358 | 6.8 | 145 | 45 | 94 |
| C3 | 25 | 75 | RhCl(TPPMS)$_3$ | 0.0375 | 0 | 6.8 | 160 | 21 | 43 |
| 4 | 25 | 75 | RhCl(TPPMS)$_3$ | 0.0374 | 0.358 | 6.8 | 160 | 21 | 92 |
| 5 | 25 | 75 | RhCl(TPPMS)$_3$ | 0.0097 | 0.358 | 6.8 | 160 | 24 | 83 |
| 6 | 25 | 75 | RhCl(TPPMS)$_3$ | 0.0295 | 0.358 | 6.8 | 160 | 23 | 81 |
| 7 | 25 | 75 | RhCl(TPPMS)$_3$ * | 0.0374 | 0.358 | 6.8 | 160 | 22 | 76 |

* 0.4 g of cetyl trimethyl ammonium bromide (CTAB) was also used in this experiment.

The foregoing examples and comparison examples clearly show that under a broad variety of operating conditions it is possible to achieve a high degree of hydrogenation in the process pursuant to the invention. Hydrogenation of the latex in the presence of the water-soluble catalyst is greatly improved by the addition of the water-insoluble co-catalyst. For all examples when PPh$_3$ was used, degrees of hydrogenation of greater than 80 percent can be achieved without any organic solvent. Higher than 90 percent of hydrogenation degrees were achieved by using higher catalyst loading under otherwise similar operating conditions.

For latex hydrogenation in the presence of the water-soluble catalyst system with the triphenylphosphine co-catalyst, the integrity of the latex is retained and no gel formation is observed.

The invention claimed is:

1. A process for selectively hydrogenating carbon-carbon double bonds in a diene-based polymer comprising subjecting a diene-based polymer which is present in latex form to a hydrogenation in the presence of a water-soluble rhodium containing catalyst and a water-insoluble co-catalyst, but in the absence of any organic solvent.

2. The process according to claim 1, wherein the water-soluble rhodium containing catalyst has the general formula (I)

$$RhQL_x \quad (I)$$

wherein

Q is a hydride or an anion other than a hydride,
L is a water-soluble ligand, and
x is 1, 2, 3 or 4.

3. The process according to claim 2, wherein a water-soluble rhodium containing catalyst of the general formula (I) is used wherein Q is a hydride or an anion other than a hydride,
L is a water-soluble ligand having the general formula (II)

$$R^1_m B \quad (II)$$

in which
R$^1$ is identical or different and represents an alkyl group, a cycloalkyl group, an aryl group, or an aralkyl group, wherein at least one of the groups R$^1$ is sulphonated one or more times,
B is phosphorus, arsenic, sulfur, or a sulphoxide group S=O, and
m is 2 or 3, and
x is 2, 3 or 4.

4. The process according to claim 3, wherein the water-soluble rhodium containing catalyst is selected from the group consisting of RhCl(TPPMS)$_3$ or RhCl(TPPTS)$_3$.

5. The process according to claim 2, wherein a water-soluble rhodium containing catalyst of the general formula (I) is used wherein Q is a hydride or an anion other than a hydride,
L is a water-soluble ligand having the general formula (III)

$$R^2_n B\text{-}A\text{-}B\ R^3_n \quad (III)$$

in which
R$^2$ is identical or different and represents an alkyl group, a cycloalkyl group, an aryl group, or an aralkyl group,
R$^3$ is identical or different and represents an alkyl group, a cycloalkyl group, an aryl group, or an aralkyl group, provided that at least one of the groups R$^2$ or R$^3$ is sulphonated one or more times,
B is phosphorus, or arsenic,
A represents a spacer group, and
n is 2 and
x is 1 or 2.

6. The process according to claim 1, wherein the co-catalyst is of the general formula (IV)

$$R^4_o D \quad (IV)$$

wherein
R$^4$ is identical or different and represents alkyl, aryl, cycloalkyl, or aralkyl,
D is phosphorus, arsenic, sulfur, or a sulphoxide group S=O, and
o is 2 or 3.

7. The process according to claim 1, wherein the water-insoluble co-catalyst is of the general formula (V)

$$R^5_p E\text{-}A\text{-}E\ R^6_p \quad (V)$$

in which
R$^5$ is identical or different and represents an alkyl group, a cycloalkyl group, an aryl group or an aralkyl group,
R$^6$ is identical or different and represents an alkyl group, a cycloalkyl group, an aryl group or an at least once sulphonated aralkyl group,
E is phosphorus, or arsenic,
A represents a spacer group, preferably phenylene or a C$_1$-C$_{20}$ alkylene group or a single bond, and
p is 2.

8. The process according to claim 1, wherein the co-catalyst is triphenylphosphine.

9. The process according to claim 1, wherein the hydrogenation is carried out in the presence of a water-soluble rhodium catalyst of the general formula (I)

$$RhQL_X \quad (I)$$

wherein
Q is a hydride or an anion other than a hydride, and
L has either the general formula (II)

$$R^1{}_B \quad (II)$$

wherein
$R^1$ is identical or different and represents a $C_1$-$C_8$-alkyl group, a $C_4$-$C_8$-cycloalkyl group, a $C_6$-$C_{15}$-aryl group or a $C_7$-$C_{15}$-aralkyl group, wherein at least one of the groups $R^1$ is sulphonated one or more times,
B is phosphorus, arsenic, sulfur, or a sulphoxide group S=O, and
m is 2 or 3,
or L has the general formula (III)

$$R^2{}_n C\text{-}A\text{-}C\, R^3{}_n \quad (III)$$

wherein
$R^2$ is identical or different and represents a $C_1$-$C_8$-alkyl group, a $C_4$-$C_8$-cycloalkyl group, a $C_6$-$C_{15}$-aryl group or a $C_7$-$C_{15}$-aralkyl group,
$R^3$ is identical or different and represents a $C_1$-$C_8$-alkyl group, a $C_4$-$C_8$-cycloalkyl group, a $C_6$-$C_{15}$-aryl group or a $C_7$-$C_{15}$-aralkyl group,
provided that at least one of the groups $R^2$ or $R^3$ is sulphonated one or more times,
C is phosphorus, or arsenic,
A represents a spacer group, and
n is 2
and wherein
x is 1, 2, 3 or 4,
and in the presence of a co-catalyst having either the general formula (IV)

$$R^4{}_O D \quad (IV)$$

wherein
$R^4$ is identical or different and represents alkyl, aryl, cycloalkyl, or aralkyl,
D is phosphorus, arsenic, sulfur, or a sulphoxide group S=O, and
o is 2 or 3
or L has the general formula (V)

$$R^5{}_p E\text{-}A\text{-}E\, R^6{}_p \quad (V)$$

wherein
$R^5$ is identical or different and represents a $C_1$-$C_8$-alkyl group, a $C_4$-$C_8$-cycloalkyl group, a $C_6$-$C_{15}$-aryl group or a $C_7$-$C_{15}$-aralkyl group,
$R^6$ is identical or different and represents a $C_1$-$C_8$-alkyl group, a $C_4$-$C_8$-cycloalkyl group, a $C_6$-$C_{15}$-aryl group or a $C_7$-$C_{15}$-aralkyl group,
E is phosphorus, or arsenic,
A represents a spacer group or a $C_1$-$C_8$-alkylene group or a single bond, and
p is 2.

10. The process according to claim 1, wherein of from 0.01% b.w. to 5.0% b.w., of the water-soluble rhodium containing catalyst is used, based on the weight of the polymer solid content of the latex.

11. The process according to claim 1, wherein up to 5000% b.w., of the co-catalyst is used, based on the weight of water-soluble catalyst.

12. The process according to claim 1, wherein the carbon-carbon double bonds containing polymer comprises repeating units of at least one conjugated diene as monomer (a) and at least one further copolymerizable monomer (b).

13. The process according to claim 12, wherein monomers (b) are selected from the group consisting of olefins, vinylaromatic monomers, vinylesters of aliphatic, branched $C_1$-$C_{18}$ monocarboxylic acids, or mixtures thereof are used.

14. The process according to claim 12, wherein the polymer is an aqueous emulsion of a copolymer of 1,3-butadiene and styrene or alpha-methylstyrene.

15. The process according to claim 12, wherein monomers (b) are selected from the group consisting of ethylenically unsaturated mono- or dicarboxylic acids or mixtures thereof or esters of ethylenically unsaturated mono- or dicarboxylic acids.

16. The process according to claim 12, wherein as monomers (b) are selected from the group consisting of α,β-unsaturated nitriles, or mixtures thereof.

17. The process according to claim 12, wherein an aqueous emulsion of a terpolymer of acrylonitrile, 1,3-butadiene and a third monomer selected from the group consisting of fumaric acid, maleic acid, acrylic acid, methacrylic acid, n-butyl acrylate, tert-butyl acrylate, or mixtures thereof are subjected to hydrogenation.

18. The process according to claim 1, wherein the polymer has a solid content in the latex is in the range of from 1 to 75% by weight, based on the total weight of the latex.

19. The process according to claim 18, wherein the polymer solid content in the latex is in the range of from 5 to 30% by weight based on the total weight of the latex.

20. The process according to any one of claim 3, 5, or 9, wherein Q of the general formula (I) is a halide, selected from the group consisting of a chloride or bromide ion.

21. The process according to claim 3, wherein $R^1$ of the general formula (II) is identical or different and selected from the group consisting of a $C_1$-$C_8$-alkyl group, $C_4$-$C_8$-cycloalkyl group, $C_6$-$C_{15}$-aryl group or $C_7$-$C_{15}$-aralkyl group, wherein at least one of the groups $R^1$ is sulphonated one or more times.

22. The process according to claim 3, wherein x of the general formula (I) is 3 when Q is halide.

23. The process according to claim 3, wherein x of the general formula (I) is 4 when Q is hydride.

24. The process according to claim 5, wherein $R^2$ of the general formula (III) is identical or different and selected from the group consisting of $C_1$-$C_8$-alkyl group, $C_4$-$C_8$-cycloalkyl group, $C_6$-$C_{15}$-aryl group or $C_7$-$C_{15}$-aralkyl group.

25. The process according to claim 5, wherein $R^3$ of the general formula (III) is identical or different and selected from the group consisting of a $C_1$-$C_8$-alkyl group, $C_4$-$C_8$-cycloalkyl group, $C_6$-$C_{15}$-aryl group, $C_6$-$C_{15}$-aryl group or $C_7$-$C_{15}$-aralkyl group.

26. The process according to claim 5, wherein A of the general formula (III) is a spacer group selected from the group consisting of phenylene, a $C_1$-$C_{20}$ alkylene group or a single bond.

27. The process according to claim 6 wherein $R^4$ of the general formula (IV) is identical or different selected from the groups consisting of a $C_1$-$C_8$-alkyl, $C_6$-$C_{15}$-aryl, $C_4$-$C_8$-cycloalkyl or $C_7$-$C_{15}$-aralkyl.

28. The process according to claim 9 wherein A of the general formula (III) represents a spacer group selected from the group consisting of a phenylene, a $C_1$-$C_{20}$ alkylene group or a single bond.

29. The process according to claim 9 wherein $R^4$ of the general formula (IV) is identical or different and selected from the group consisting of a $C_1$-$C_8$-alkyl, $C_6$-$C_{15}$-aryl, $C_4$-$C_8$-cycloalkyl or $C_7$-$C_{15}$-aralkyl.

30. The process according to claim 15, wherein monomers (b) are selected from the group consisting of acrylic acid, methacrylic acid, maleic acid, fumaric acid, itaconic acid, or acrylic acid, methacrylic acid, maleic acid, fumaric acid and itaconic acid with $C_1$-$C_{12}$ alkanols, selected from the group containing methanol, ethanol, n-propanol, isopropanol, 1-butanol, 2-butanol, isobutanol, tert-butanol, n-hexanol, 2-ethylhexanol, or $C_5$-$C_{10}$ cycloalkanols, selected from the group containing, cyclopentanol or cyclohexanol are used.

31. The process according to claim 15 wherein monomers (b) are selected from the group consisting of methyl methacrylate, n-butyl methacrylate, tert-butyl methacrylate, n butyl acrylate, tert-butyl acrylate, and 2-ethylhexyl acrylate.

32. The process according to claim 12, wherein monomers (b) are selected from the group consisting of acrylonitrile, methacrylonitrile, ethacrylonitrile or mixtures thereof.

33. The process according to claim 12, wherein an aqueous dispersion of a nitrile rubber ("NBR") comprising a copolymer of an α,β-unsaturated nitrile, optionally acrylonitrile, and a conjugated diene, optionally 1,3-butadiene and optionally at least one further copolymerizable monomer, selected from the group containing an α,β-unsaturated mono- or dicarboxylic acid, their esters or amides is subjected to hydrogenation.

* * * * *